United States Patent
Sprang et al.

(10) Patent No.: US 7,684,619 B2
(45) Date of Patent: Mar. 23, 2010

(54) TEXT FLOW IN AND AROUND IRREGULAR CONTAINERS

(75) Inventors: Steve Sprang, Mountain View, CA (US); Scott Lindsey, Portland, OR (US)

(73) Assignee: Apple Inc., Cupertino, CA (US)

( * ) Notice: Subject to any disclaimer, the term of this patent is extended or adjusted under 35 U.S.C. 154(b) by 996 days.

(21) Appl. No.: 11/329,385

(22) Filed: Jan. 9, 2006

(65) Prior Publication Data
US 2007/0160290 A1    Jul. 12, 2007

(51) Int. Cl.
G06K 9/34 (2006.01)
G06F 17/21 (2006.01)
G06K 9/00 (2006.01)

(52) U.S. Cl. ................ 382/176; 715/210

(58) Field of Classification Search .......... 382/164, 382/168, 173, 176, 178, 181, 203, 204, 218–220, 382/242, 276, 277, 284; 358/1.1, 1.13, 1.18, 358/462; 345/473, 506, 519, 545; 707/521; 715/210
See application file for complete search history.

(56) References Cited

U.S. PATENT DOCUMENTS

| | | | | |
|---|---|---|---|---|
| 5,659,336 A * | 8/1997 | Patrick et al. | .............. | 345/545 |
| 5,701,444 A * | 12/1997 | Baldwin | .............. | 345/506 |
| 6,038,342 A * | 3/2000 | Bernzott et al. | ............ | 382/173 |
| 6,081,816 A * | 6/2000 | Agrawal | .............. | 715/210 |
| 6,257,693 B1 * | 7/2001 | Miller et al. | .............. | 347/19 |
| 6,476,925 B2 * | 11/2002 | Nguyen et al. | ............ | 358/1.13 |
| 6,587,599 B1 * | 7/2003 | Huang | .............. | 382/284 |
| 7,034,835 B2 * | 4/2006 | Whatmough | ............ | 345/473 |
| 2006/0033745 A1* | 2/2006 | Koselj et al. | ............. | 345/519 |
| 2007/0160290 A1* | 7/2007 | Sprang et al. | ............ | 382/176 |

* cited by examiner

*Primary Examiner*—Amir Alavi
(74) *Attorney, Agent, or Firm*—Van Pelt, Yi & James LLP

(57) ABSTRACT

Providing text flow in or around an irregular container, such as a non-rectangular graphic, is disclosed. In the case of flow around a container, the intersection, if any, between a proposed text rectangle and the irregular container is determined. A valid rectangle, if any, that is not within the bounds in the x-direction of an area of intersection between the proposed text rectangle and the graphic is identified as a valid text area within the proposed text rectangle. In the case of flow around a container, one or more difference areas, if any, in which a proposed text rectangle is present but the container is not present are found. A valid rectangle, if any, that is not within the bounds in the x-direction of any of said one or more difference areas is identified as a valid text area within the proposed text rectangle.

15 Claims, 8 Drawing Sheets

TEXT FLOW IN AND AROUND IRREGULAR CONTAINERS

BACKGROUND OF THE INVENTION

Creators of text-containing documents sometimes desire to set off a portion of text from other text appearing on a page, for example to include a vignette, background information, a quotation, or other information related to a topic that is the subject of other text on the page. In a typical word processing application, a user can define a rectangular text box within (e.g., overlaying) an irregularly shaped container, e.g., a geometric or other shape that is not a square or other rectangle, and enter text within the rectangular text box. However, depending on the shape of the container this approach may not maximize the use of space within the container and may not provide a visual effect desired by the creator of the document, e.g., having the text inside the container more closely follow the contours of the container.

On some occasions, a creator of a text document may wish to incorporate on the page an irregularly shaped graphic or other object, such as an irregular container containing text, and have text flow around the graphic or other object. In a typical word processing application, a graphic or other object may be incorporated into a page and text made to flow around a rectangular box defined to block out space on the page for the graphic or other object. However, depending on the shape of the container this approach may not maximize the use of space on the page and may not provide a visual effect desired by the creator of the document, e.g., having the text inside the container more closely follow the contours of the container.

Therefore, there is a need for a way to provide text flow in and around irregular containers that enables text to conform more closely to the shape of an irregular container.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Text flow in and around irregular containers is disclosed. In some embodiments, text flow around an irregular container includes finding the intersection, if any, between a proposed text rectangle and the irregular container and identifying as a valid text area within the proposed text rectangle a valid rectangle, if any, that is not within the bounds in the x-direction of an area of intersection between the proposed text rectangle and the graphic. In some embodiments, text flow within an irregular container includes finding one or more difference areas, if any, in which a proposed text rectangle is present but the container is not present and identifying as a valid text area within the proposed text rectangle a valid rectangle, if any, that is not within the bounds in the x-direction of any of said one or more difference areas.

Figure 1A:
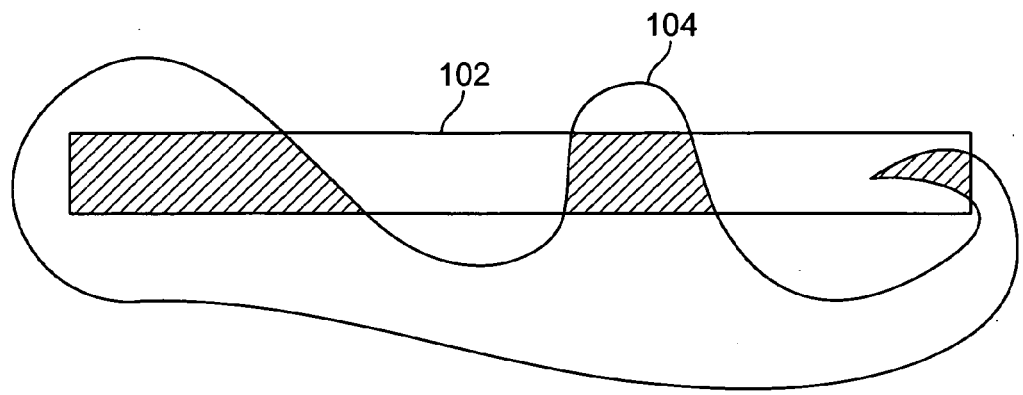
FIGS. 1A and 1B illustrate an embodiment of a process for providing text flow around an irregular container.
Figure 1B:
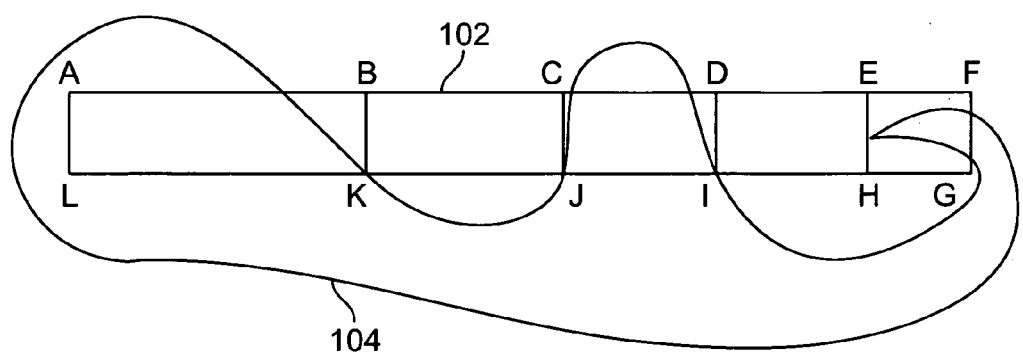

FIGS. 1A and 1B illustrate an embodiment of a process for providing text flow around an irregular container. In the example shown, a rectangle 102 has been proposed to contain text intended to flow around an irregularly shaped container (or graphic) 104. In FIG. 1A areas of intersection between the rectangle 102 and container 104 are cross hatched. As shown in FIG. 1B, in some embodiments, the bounds of the areas of intersection—in this example the bounding rectangles ABKL, CDIJ, and EFGH—in the x-direction are determined and excluded (i.e., subtracted) from the originally proposed text rectangle. In some embodiments, the bounding rectangles are determined, sorted into an order, e.g., by minimum "x" axis coordinate, and adjacent and/or overlapping bounding rectangles are combined, after which the sorted and (if applicable) combined bounding rectangles are excluded (i.e., subtracted) from the originally proposed text rectangle. In some embodiments, adjacent or successive holes that are not touching or overlapping but are determined to be within a threshold distance of each other in the x-direction are combined, e.g., to avoid identifying as a valid text area an area that is not wide enough to include a meaningful amount of text. The excluded rectangles, or "holes", are used to determine remaining valid text rectangles BCJK and DEHI in which in this example text flowing around the container 104 may be included. In some embodiments, the rectangle 102 is proposed by a text system portion of a word processing or other application to a text flow (sometimes referred to herein as a "text wrapper") portion of the word processing or other application. In some embodiments, the text flow portion receives from the text system portion a proposed rectangle such as proposed text rectangle 102 and an indication of whether text is intended to flow within or around the intersecting irregular container (or other graphic), and the text flow portion returns to the text system the valid rectangles, if any, included in the proposed rectangle, in this example rectangles BCJK and DEHI.

Figure 2A:
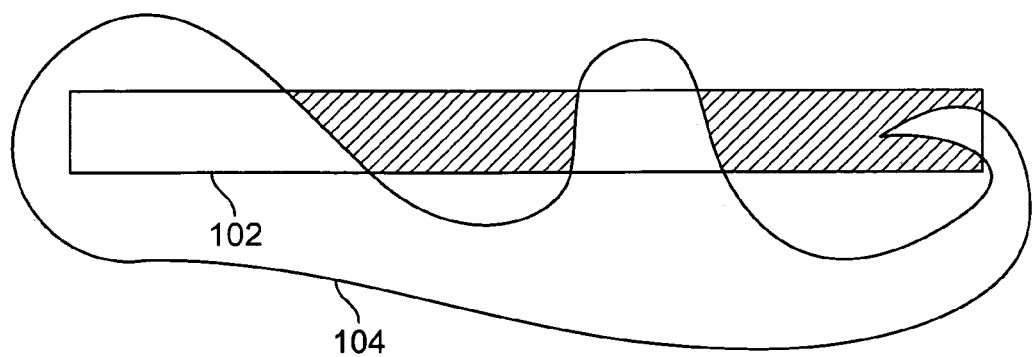
FIGS. 2A and 2B illustrate an embodiment of a process for providing text flow within an irregular container.
Figure 2B:
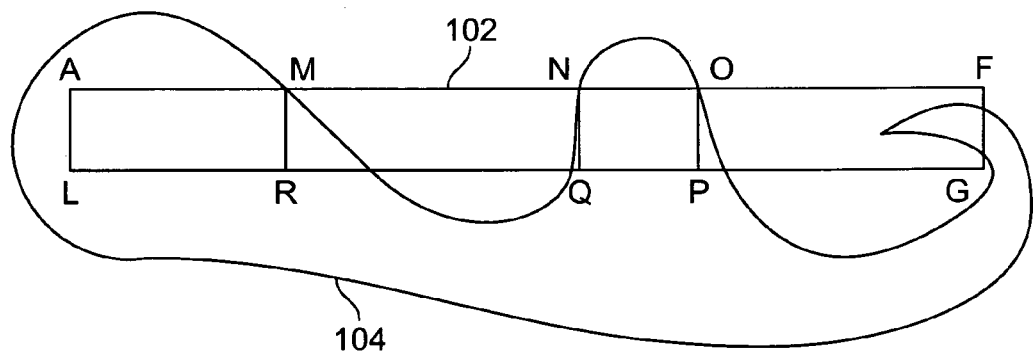

FIGS. 2A and 2B illustrate an embodiment of a process for providing text flow within an irregular container. In this example, the difference between the proposed rectangle 102 and the irregular container 104 (i.e., the area rectangle-not-container) is shown cross hatched. In some embodiments, the bounds of the difference areas, in this example the bounding rectangles MNQR and OFGP, are determined and subtracted from the originally proposed rectangle 102 to determine and return valid text rectangles AMRL and NOPQ. In this example, the right-most overlapping portion of the container 104, included in the area bounded by OFGP, is excluded because no part of that portion has sufficient height in the y-direction to have text rendered without exceeding the bounds of the container and/or with prescribed line spacing, etc.

Figure 3:
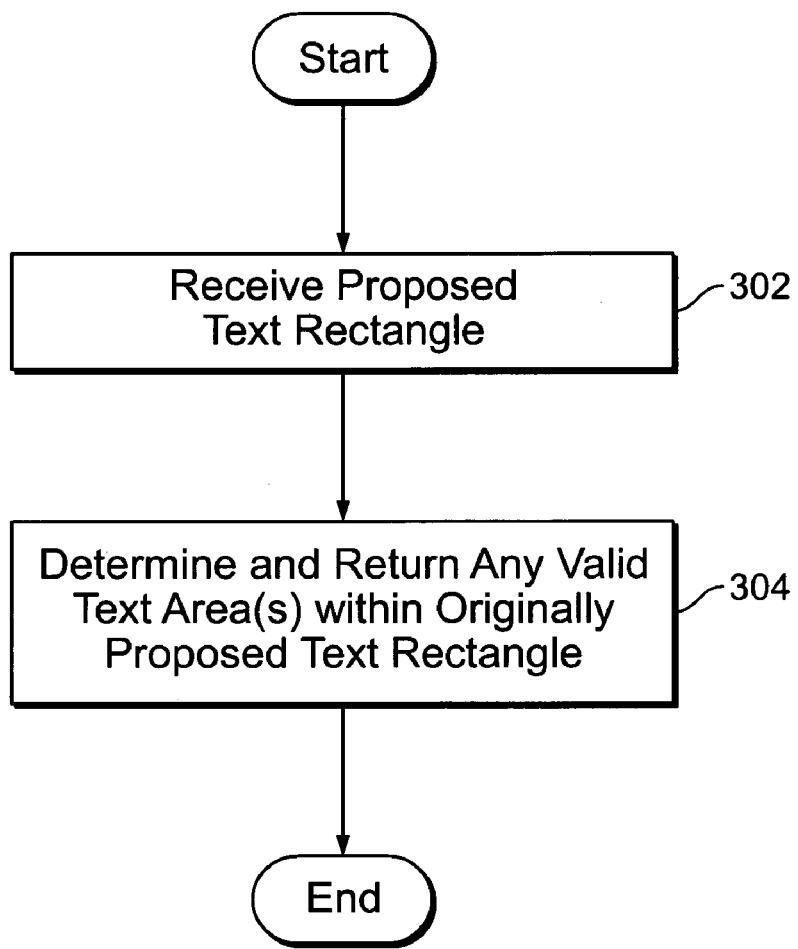
FIG. 3 is a flow chart illustrating an embodiment of a process for providing text flow within and/or around an irregular container or other graphic.

FIG. 3 is a flow chart illustrating an embodiment of a process for providing text flow within and/or around an irregular container or other graphic. At 302, a proposed rectangle is received. At 304, any valid text area(s), e.g., rectangle(s) within the proposed rectangle received at 302 are determined and returned. In various embodiments, the valid areas are determined as described above in connection with FIGS. 1A-2B, as applicable, e.g., depending on whether text is to flow within or around the irregular container or other graphic.

Figure 4:
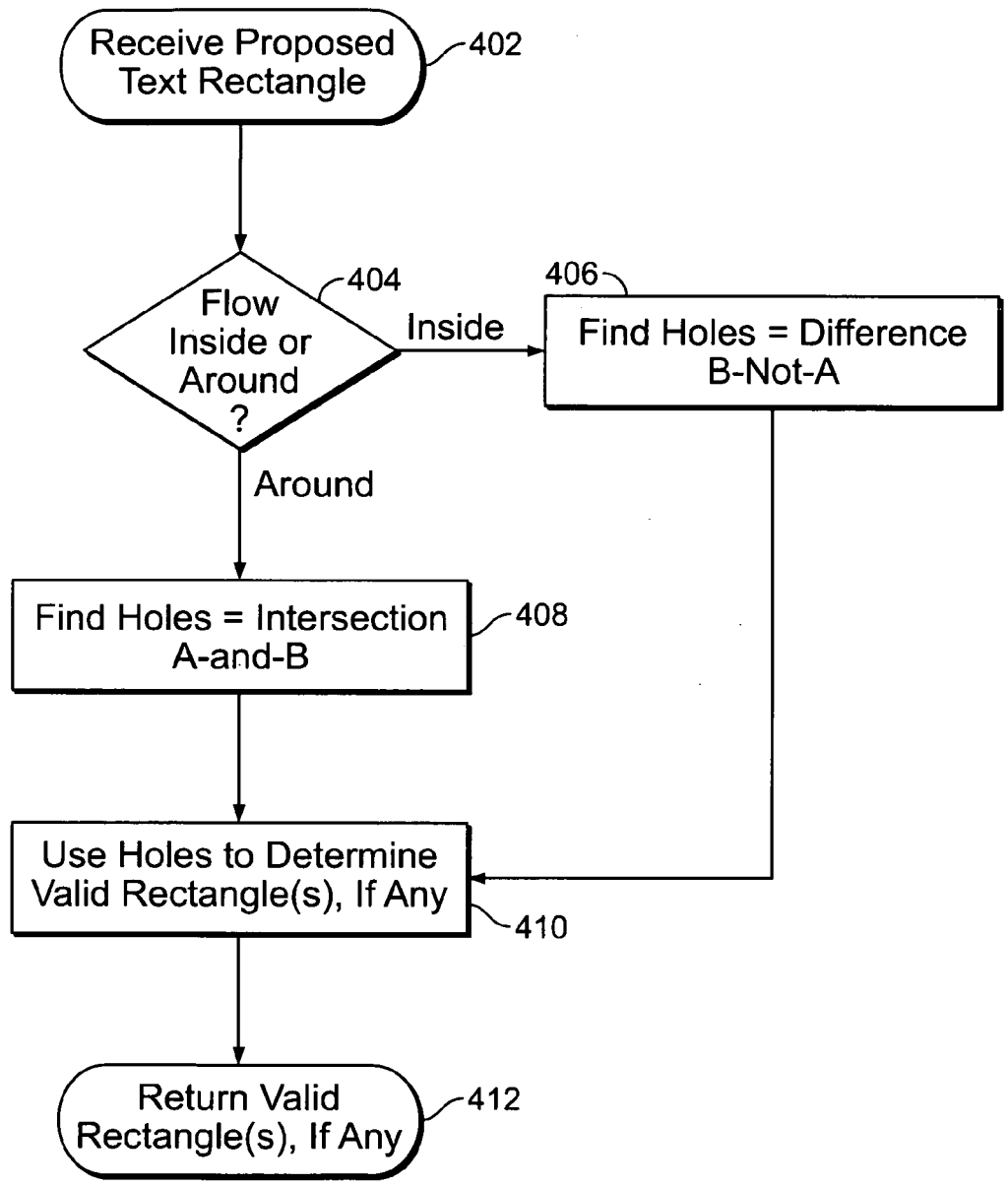
FIG. 4 is a flow chart illustrating an embodiment of a process for determining valid text areas within and/or around an irregular container or other graphic.

FIG. 4 is a flow chart illustrating an embodiment of a process for determining valid text areas within and/or around an irregular container or other graphic. In some embodiments, 304 of FIG. 3 includes the process of FIG. 4. After receiving a proposed rectangle (402), it is determined at 404 whether text is to flow around or inside a container that intersects with the proposed rectangle. In some embodiments, a text system or other process or module that proposes the text rectangle, e.g., to a text flow and/or wrapping process or module, sets a flag or other data value that indicates whether text is to flow inside or around the container. In some embodiments, the text system is configured to recognize when a proposed text rectangle, e.g., for a next line of text, overlaps with a container around or within which text is to flow and sends the proposed rectangle to the text flow and/or wrapping module to determine which portion(s), if any, of the proposed rectangle are valid to be used. If the text for which the proposed rectangle was proposed is to flow inside the container, at 406 the bounds of the areas in which the proposed rectangle "B" but not the container "A" are present (i.e., the difference obtained by subtracting from the proposed rectangle areas in which the container overlaps it) are determined and considered to be "holes" within which text cannot be included. If text for which the proposed rectangle was proposed is to flow around the container, at 408 the bounds of the areas of intersection (overlap) of the container "A" and the proposed rectangle "B" are determined and considered to be "holes" within which text cannot be included. At 410, the "holes" determined at 406 or 408, as applicable, are used to define positive areas, i.e., valid rectangles, if any, within which text may be included, and the valid rectangle(s), if any, are returned at 412. In some embodiments, 406 and/or 408, as applicable, include sorting holes by minimum x and merging overlapping and adjacent holes. In some embodiments, a container or other graphic is described as a Bezier path and holes are identified in 406 and/or 408, as applicable, in part by determining a polygon that approximates the Bezier path, and then using a publicly-available software tool, such as Alan Murta's General Polygon Clipper described and available via the Internet at www.cs.man.ac.uk/~toby/alan/software/, to determine the intersection and/or difference, as applicable, between the proposed rectangle and the container.

Figure 5:
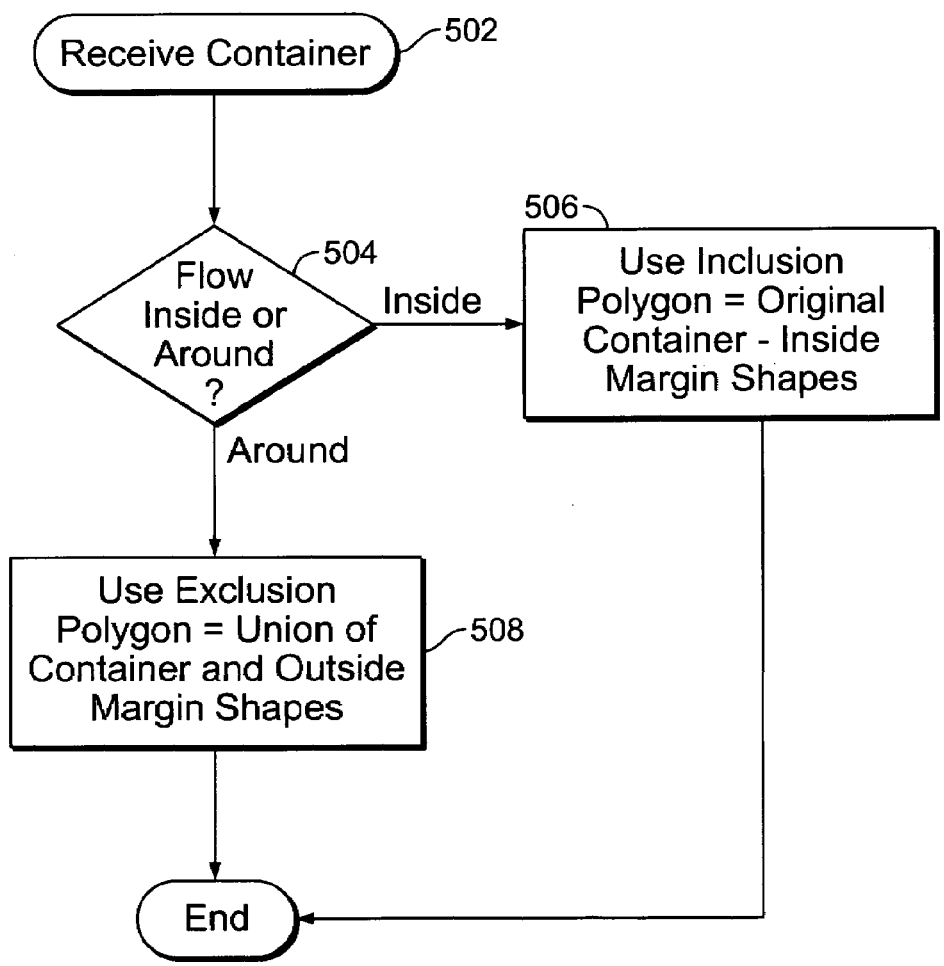
FIG. 5 is a flow chart illustrating an embodiment of a process for defining an exclusion polygon that optionally provides a margin between a container and text that flows around and/or within the container.

FIG. 5 is a flow chart illustrating an embodiment of a process for defining an exclusion polygon that optionally provides a margin between a container and text that flows around and/or within the container. At 502 a container is received. In some embodiments, 502 includes receiving via a user interface a selection from a menu of predefined containers. In some embodiments, 502 includes generating and/or updating a Bezier path describing the container. In some embodiments, a user may define and/or change the shape and/or size of the container via well known user interfaces, such as a drawing tool or changing the size or relative dimensions of a bounding box, outline, or other display or interface having such controls and/or functionality. At 504, it is determined whether text is to flow inside the container, around the container, or both. At 506, for determining valid text areas inside the container, including an allowance for an inside margin, an inclusion polygon to be used to determine valid text areas inside the container, e.g., as in 406 and 410 of FIG. 4, is determined by subtracting from the original container shape a set of inside margin shapes superimposed on the original container. In some embodiments, 506 includes defining a polygon that at least approximates an original container described originally as a Bezier path, defining for each side of the polygon a rectangle that is twice as wide as the desired inside margin, encloses the side, and is bisected by the side; defining for each vertex of the polygon a circle of radius equal to the desired inside margin centered on the vertex; and subtracting from the polygon that at least approximates the original container areas of overlap between the above-described rectangles and circles, referred herein and in FIG. 5 as "inside margin shapes".

At 508, for determining valid text areas around the container, including an allowance for an outside margin, an exclusion polygon to be used to determine valid areas for text to flow around the container, e.g., as in 408 and 410 of FIG. 4, is determined by uniting with the original container shape a set of outside margin shapes superimposed on the original container. In some embodiments, 508 includes defining a polygon that at least approximates an original container described originally as a Bezier path, defining for each side of the polygon a rectangle that is twice as wide as the desired outside margin, encloses the side, and is bisected by the side; defining for each vertex of the polygon a circle of radius equal to the desired outside margin centered on the vertex; and using the union of the polygon that at least approximates the original container and the above-described rectangles and circles, referred herein and in FIG. 5 as "outside margin shapes", as an exclusion polygon to be used to determine "holes" in a proposed rectangle, as in 408 and 410 of FIG. 4. It is noted that if the inside and outside margins are the same, the inside margin shapes and the outside margin shapes are likewise the same and in some embodiments the processing described in connection with 506 and 508 for defining the margin shapes is performed only once. In some embodiments, the inclusion polygon determined in 506 and/or the exclusion polygon determined in 508 is described and/or at least approximated by a polygon, e.g., to enable the General Polygon Clipper or a similar software tool to be used to perform clipping operations (e.g., intersection, difference/ subtraction) between a proposed text rectangle and the inclusion and/or exclusion polygon, as applicable.

Figure 6A:
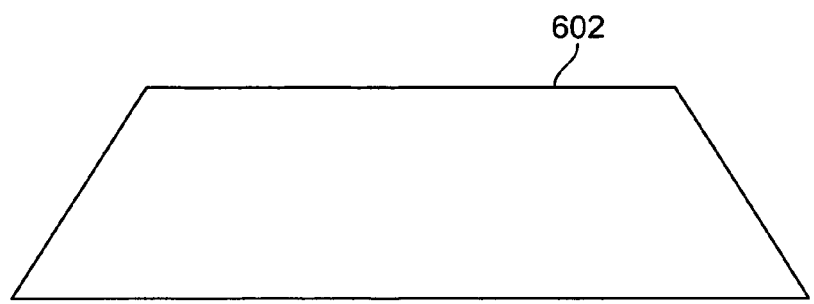
FIGS. 6A-7B illustrate an example of the process of FIG. 5 as applied to a container in the shape of a trapezoid.
Figure 6B:
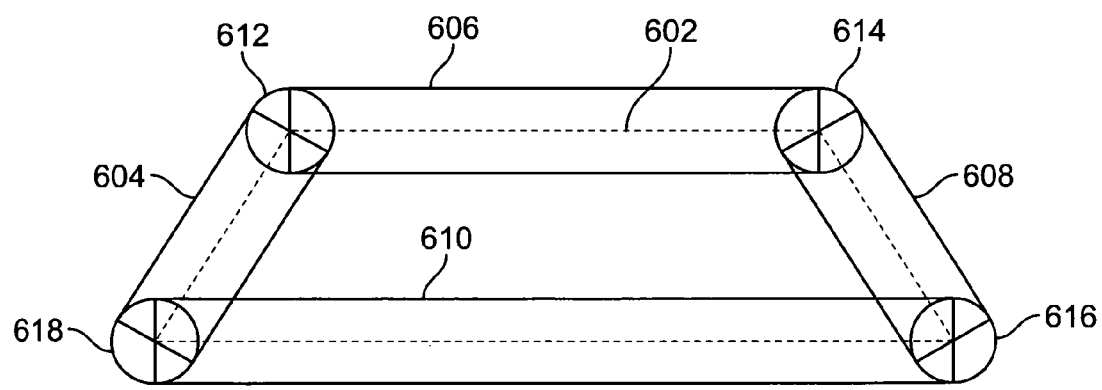

FIGS. 6A-7B illustrate an example of the process of FIG. 5 as applied to a container in the shape of a trapezoid. FIG. 6A shows an irregular container 602 in the shape of a trapezoid. FIG. 6B shows the container 602, in dashed lines, enclosed by a set of margin shapes comprising rectangles 604-610 and circles 612-618. In this example, the width of rectangles 604-610 is twice the desired inside and/or outside margin, as applicable, and the radius of each of the circles 612-618 is equal to the applicable desired margin. In various embodiments, the margin is expressed as a number of typeset points, in inches or other units of measure, and/or otherwise.

Figure 7A:
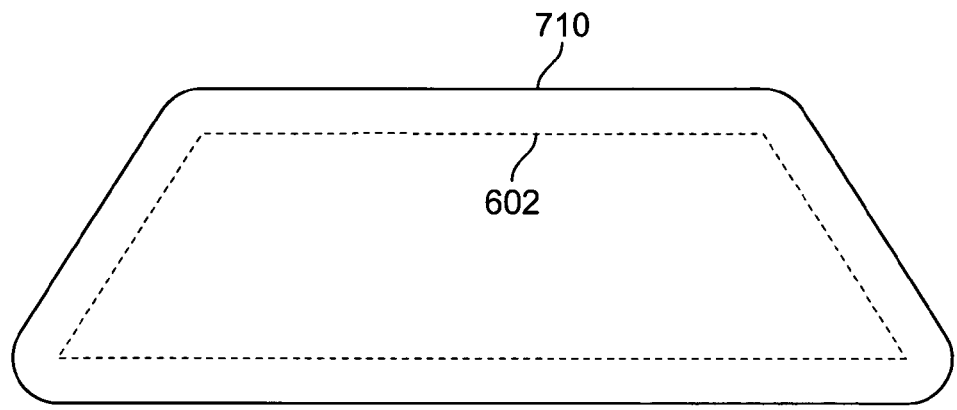

FIG. 7A shows an exclusion shape 710 determined, as in 508, by finding the union of the margin shapes 604-618 of FIG. 6 and the original container 602, the latter being shown in FIG. 7A in dashed lines for reference. As noted above, while the exclusion shape 710 as shown in FIG. 7A has rounded corners, in some embodiments the shape 710 is at least approximated by a polygon (e.g., one using a series of short sides to approximate the rounded corners shown in FIG. 7A) and this exclusion polygon is used to define "holes" to be excluded from a proposed text rectangle. In some embodiments, valid areas for text to flow around container 602, if any, would be determined in this example by considering as holes the bounds of areas of intersection between a proposed text rectangle and the exclusion shape 710 and using the holes to determine and return positive areas, if any, in which text to flow around the container 602 may be included.

Figure 7B:
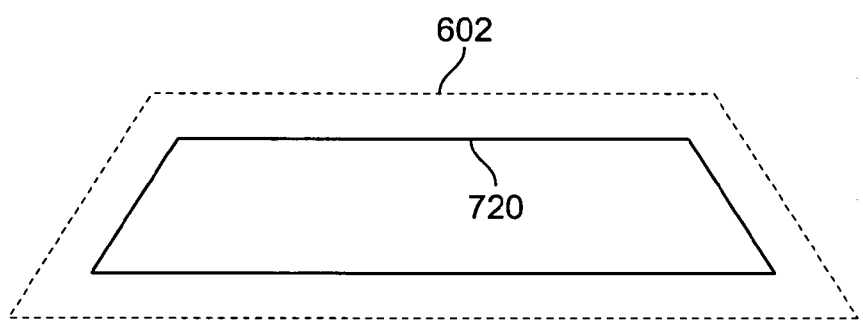

FIG. 7B shows an inclusion shape 720 determined by subtracting margin shapes 604-618 from the original container 602, the latter being shown in FIG. 7B in dashed lines for reference. In some embodiments, if the inclusion shape 720 had rounded corners, the shape 720 would be at least approximated by a polygon (e.g., one using a series of short sides to approximate any rounded corners) and this inclusion polygon would be used to find valid text areas, if any, within a proposed text rectangle. In some embodiments, valid areas for text to flow within container 602, if any, would be determined in this example by considering as holes the bounds of areas of difference between a proposed text rectangle and the inclusion shape 720 and using the holes to determine and return positive areas, if any, in which text to flow within the container 602 may be included.

In some embodiments, a text system or other process or module configured to generate (proposed) text rectangles is configured to respond to an indication that a first proposed text rectangle has no valid text areas for text to flow around and/or within a container, as applicable, by proposing a next proposed text rectangle that is one pixel lower in the y-direction than the first proposed text rectangle. In this way, text is included at the first (highest in the y-direction) possible position. However, in some cases a container may have a shape such that the above-described approach of advancing pixel-by-pixel results in needless successive cycles of proposing text rectangles on the part of the text system or other process or module and processing proposed text rectangles to determine and return a null result on the part of the text flow or wrapping process or module, with concomitant loss of time and computing resources. In some embodiments, this potential inefficiency is avoided by configuring the text flow or wrapping process or module to look ahead, in various embodiments either pixel-by-pixel, e.g., up to a prescribed and/or configurable limit, or by skipping ahead a prescribed and/or configurable number of pixels and/or a distance determined by applying a "look ahead" algorithm, to find and return to the text system a place marker (e.g., a y-direction location) to be used to propose a text rectangle that has been pre-determined to include at least one valid text area. In some embodiments, for flow around an irregular container the following look ahead algorithm is used if there are no valid rectangles in a proposed text rectangle: 1) extend the bottom of the proposed rectangle to the bottom of the irregular shape; 2) unite the irregular shape with the extended rectangle; 3) subtract the original irregular shape and the original proposed rectangle from the union; and 4) if the result is empty (i.e., no resulting shape is left after subtracting the original irregular shape and the original proposed rectangle, e.g., because the extended rectangle is enclosed within the union of the original irregular shape and the original proposed rectangle), skip ahead in the y-direction by a distance D equal to the bottom of the extended rectangle minus the bottom of the original proposed text rectangle, otherwise (i.e., if the result of subtracting the original irregular shape from the union of the extended rectangle with the original irregular shape and the original proposed text rectangle is not empty) skip ahead a distance D equal to the top of the shape derived in step 3 minus the bottom of the original proposed text rectangle. In some embodiments, the text flow or wrapping process or module treats the next valid proposed text rectangle as having been proposed and returns as valid rectangles the valid portions of the proposed rectangle found by looking ahead as described above.

Figure 8:
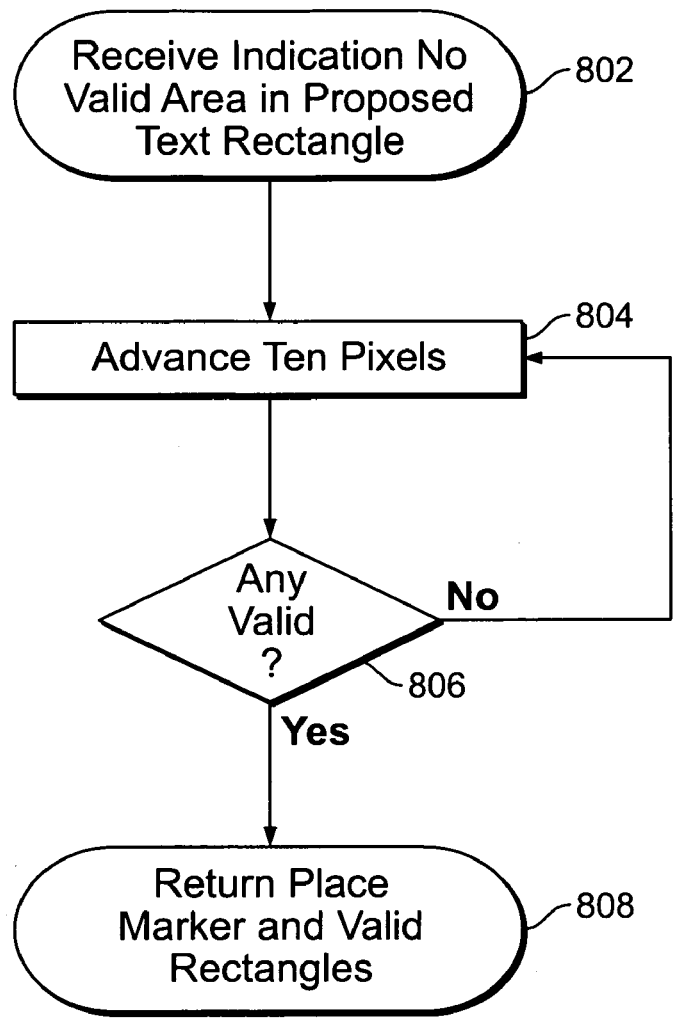
FIG. 8 is a flow chart illustrating an embodiment of a process for looking ahead to find a next proposed text rectangles that includes valid text areas.

FIG. 8 is a flow chart illustrating an embodiment of a process for looking ahead to find a next proposed text rectangles that includes valid text areas. In 802, an indication is received, e.g., by a text flow or wrapping process or module, that there are no valid text areas in a received proposed text rectangle. At 804, the text flow or wrapping process or module advances the proposed rectangle by ten pixels in the y-direction. At 806 it is determine whether the advanced proposed text rectangle includes any valid text area. In some embodiments, 806 includes performing a difference and/or intersection operation, as applicable, determining whether the result is a hole coextensive with the advanced proposed rectangle, and if so concluding the advanced proposed rectangle includes no valid text area. In some embodiments, complete processing, e.g., as in FIG. 4, is performed for each iteration of 804-806. Once a proposed rectangle that includes at least one valid text area is found, at 808 a place marker or other data identifying the next valid proposed rectangle and/or or in some embodiments any associated valid text areas are returned. In some alternative embodiments, the process of FIG. 8 advances pixel-by-pixel, in some embodiments up to a prescribed limit, until a proposed text rectangle that includes at least one valid text area is found, instead of skipping ahead as in 804.

Although in certain of the embodiments described above an "irregular" container is referred to, the techniques described herein are suitable for providing text flow in and/or around containers of any arbitrary shape, whether regular or not.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for providing text flow around a non-rectangular graphic, comprising:
   using a processor to find the intersection, if any, between a proposed text rectangle and the graphic; and
   using the processor to identify as a valid text area within the proposed text rectangle a valid rectangle, if any, that is not within the bounds in the x-direction of an area of intersection between the proposed text rectangle and the graphic; and further comprising, in the event no valid text area is found, using the processor to look ahead by:

extending the bottom of the proposed rectangle to the bottom of the graphic to form an extended rectangle;

uniting the graphic with the extended rectangle;

subtracting the graphic and the proposed rectangle from the union of the graphic with the extended rectangle;

skipping ahead in the y-direction by a distance equal to the bottom of the extended rectangle minus the bottom of the proposed rectangle if the result of subtracting the graphic and the proposed rectangle from the union of the graphic with the extended rectangle is empty; and skipping ahead in the y-direction by a distance equal to the top of the result of subtracting the graphic and the proposed rectangle from the union of the graphic with the extended rectangle minus the bottom of the proposed rectangle if the result of subtracting the graphic and the proposed rectangle from the union of the graphic with the extended rectangle is not empty.

2. A method as recited in claim 1, wherein finding the intersection, if any, between a proposed text rectangle and the graphic includes determining a polygon that at least approximates the graphic.

3. A method as recited in claim 1, wherein identifying as a valid text area within the proposed text rectangle a valid rectangle, if any, that is not within the bounds in the x-direction of an area of intersection between the proposed text rectangle and the graphic includes determining the bounds in the x-direction of each area of intersection and considering each such area of intersection to be a hole within which text may not be included.

4. A method as recited in claim 1, wherein identifying as a valid text area within the proposed text rectangle a valid rectangle, if any, that is not within the bounds in the x-direction of an area of intersection between the proposed text rectangle and the graphic includes identifying each such valid text area, if any.

5. A method as recited in claim 1, wherein identifying as a valid text area within the proposed text rectangle a valid rectangle, if any, that is not within the bounds in the x-direction of an area of intersection between the proposed text rectangle and the graphic includes:

sorting two or more areas of intersection by their respective minimum x-coordinates;

combining overlapping or adjacent areas of intersection; and using the sorted and combined, if applicable, areas of intersection to find any valid text areas.

6. A method as recited in claim 1, wherein the graphic comprises an exclusion polygon determined by uniting with an original graphic a set of margin shapes calculated to extend the outer boundary of the original graphic by an amount equal to a desired margin between text flowing around the graphic, on the one hand, and the original graphic as and when rendered on the page, on the other hand.

7. A method as recited in claim 6, further including defining the margin shapes.

8. A method as recited in claim 7, wherein defining the margin shapes includes defining for each side of a polygon that at least approximates the graphic a rectangle that is twice as wide as the desired margin, encloses the side, and is bisected by the side; and defining for each vertex of the polygon that at least approximates the graphic a circle centered on the vertex and having a radius equal to the desired margin.

9. A method as recited in claim 1, further comprising returning as a valid text area only those valid rectangles, if any, that exceed a prescribed minimum size.

10. A system for providing text flow around a non-rectangular graphic, comprising:

a processor configured to find the intersection, if any, between a proposed text rectangle and the graphic; and identify as a valid text area within the proposed text rectangle a valid rectangle, if any, that is not within the bounds in the x-direction of an area of intersection between the proposed text rectangle and the graphic; and in the event no valid text area is found, to look ahead by:

extending the bottom of the proposed rectangle to the bottom of the graphic to form an extended rectangle;

uniting the graphic with the extended rectangle;

subtracting the graphic and the proposed rectangle from the union of the graphic with the extended rectangle;

skipping ahead in the y-direction by a distance equal to the bottom of the extended rectangle minus the bottom of the proposed rectangle if the result of subtracting the graphic and the proposed rectangle from the union of the graphic with the extended rectangle is empty; and skipping ahead in the y-direction by a distance equal to the top of the result of subtracting the graphic and the proposed rectangle from the union of the graphic with the extended rectangle minus the bottom of the proposed rectangle if the result of subtracting the graphic and the proposed rectangle from the union of the graphic with the extended rectangle is not empty; and a memory configured to provide instructions to the processor.

11. A system as recited in claim 10, wherein the processor is configured to find the intersection, if any, between the proposed text rectangle and the graphic at least in part by finding the intersection, if any, between a proposed text rectangle and the graphic includes determining a polygon that at least approximates the graphic.

12. A system as recited in claim 10, wherein the processor is configured to identify as a valid text area within the proposed text rectangle a valid rectangle, if any, that is not within the bounds in the x-direction of an area of intersection between the proposed text rectangle and the graphic at least in part by determining the bounds in the x-direction of each area of intersection and considering each such area of intersection to be a hole within which text may not be included.

13. A system as recited in claim 10, wherein the processor is configured to identify as a valid text area within the proposed text rectangle a valid rectangle, if any, that is not within the bounds in the x-direction of an area of intersection between the proposed text rectangle and the graphic at least in part by identifying each such valid text area, if any.

14. A system as recited in claim 10, wherein the processor is configured to return as a valid text area only those valid rectangles, if any, that exceed a prescribed minimum size.

15. A computer program product for providing text flow around a non-rectangular graphic, the computer program product being embodied in a computer readable medium and comprising computer instructions for:

finding the intersection, if any, between a proposed text rectangle and the graphic; and identifying as a valid text area within the proposed text rectangle a valid rectangle, if any, that is not within the bounds in the x-direction of an area of intersection between the proposed text rectangle and the graphic; and further comprising computer instructions for looking ahead, in the event no valid text area is found, including by:

extending the bottom of the proposed rectangle to the bottom of the graphic to form an extended rectangle;

uniting the graphic with the extended rectangle;

subtracting the graphic and the proposed rectangle from the union of the graphic with the extended rectangle;

skipping ahead in the y-direction by a distance equal to the bottom of the extended rectangle minus the bottom of the proposed rectangle if the result of subtracting the graphic and the proposed rectangle from the union of the graphic with the extended rectangle is empty; and skipping ahead in the y-direction by a distance equal to the top of the result of subtracting the graphic and the proposed rectangle from the union of the graphic with the extended rectangle minus the bottom of the proposed rectangle if the result of subtracting the graphic and the proposed rectangle from the union of the graphic with the extended rectangle is not empty.

* * * * *

UNITED STATES PATENT AND TRADEMARK OFFICE
CERTIFICATE OF CORRECTION

| | | |
|---|---|---|
| PATENT NO. | : 7,684,619 B2 | Page 1 of 1 |
| APPLICATION NO. | : 11/329385 | |
| DATED | : March 23, 2010 | |
| INVENTOR(S) | : Steve Sprang et al. | |

It is certified that error appears in the above-identified patent and that said Letters Patent is hereby corrected as shown below:

In column 2, line 49, delete "originally" and insert -- original --, therefor.

Signed and Sealed this
Fifteenth Day of November, 2011

David J. Kappos
*Director of the United States Patent and Trademark Office*